April 9, 1968

V. G. LOHSE 3,376,987

BALE STACK TRANSFER DEVICE

Filed Dec. 13, 1965

Vernon G. Lohse
INVENTOR.

BY *Clarence A. O'Brien*
and *Harvey B. Jacobson*
Attorneys

April 9, 1968 V. G. LOHSE 3,376,987
BALE STACK TRANSFER DEVICE
Filed Dec. 13, 1965 7 Sheets-Sheet 2

Vernon G. Lohse
INVENTOR.

BY Clarence A. O'Brien
and Harvey B. Jackson
Attorneys

April 9, 1968

V. G. LOHSE 3,376,987

BALE STACK TRANSFER DEVICE

Filed Dec. 13, 1965

Vernon G. Lohse
INVENTOR.

United States Patent Office 3,376,987
Patented Apr. 9, 1968

3,376,987
BALE STACK TRANSFER DEVICE
Vernon G. Lohse, R.D. 2, Minot, N. Dak. 58701
Filed Dec. 13, 1965, Ser. No. 513,265
16 Claims. (Cl. 214—505)

ABSTRACT OF THE DISCLOSURE

A bale stack transfer device including a frame having a pair of longitudinally spaced side beams which are hydraulically moved toward each other when the frame is placed over a bale stack so as to grip the stack. Spring loaded front and rear structural members lend support by the frame to the stack. The frame is pulled upon a truck bed for transfer of the stack to a distant location where the frame is lowered from the bed to the ground. The frame is removed from the stack and returned to the truck bed thereby depositing the stack at a final destination.

The present invention generally relates to a device for raising, transporting and unloading entire stacks of hay bales or the like, and more particularly is concerned with a device wherein an entire bale stack can be raised as a unit from the ground, positioned on a truck bed for transportation, and subsequently unloaded as a single unit without disrupting the stack or the individual bales thereof.

It is a primary object of the instant invention to provide a device, for handling a bale stack as a single unit, which is capable of raising an entire bale stack from the ground, transporting the stack and subsequently unloading the stack without disrupting the nature thereof and without necessitating any handling of the individual bales.

Another particularly significant object of the instant invention resides in the provision of a bale stack transfer device wherein stacked bales are initially raised from the ground in a substantially vertical direction and subsequently carried onto the transporting vehicle, rather than more conventional loading technique wherein the load is physically slid onto a pallet or the like which in turn requires a securely bound stack.

In conjunction with the above object, it is also a significant object of the instant invention to provide a stack transferring device wherein, as an initial step, the bales are compressed and firmly gripped, thereby preventing any disruption of the stack or the individual bales during the transfer operation, and at the same time, avoiding the necessity of independently binding or securing the stack.

Also, it is a significant object of the instant invention to provide a bale stack transfer device wherein the stack lifting frame thereof is capable of being introduced about a ground supported stack, guiding both from the main vehicle and from separate steering wheels mounted thereon, and subsequently manipulated so as to effect a compression clamping of the stack therein and a raising of the clamped stack vertically from the ground.

Furthermore, it is a significant object of the instant invention to provide means for stabilizing the entire stack during the transport thereof, including a retaining engagement with the four vertical sides thereof for substantially the full height of the sides.

In addition, while the stack is to be supported on the lifting frame through the compressive engagement with the opposite sides thereof, the instant invention also contemplates providing, in some instances, auxiliary support bars which will underly the raised stack in a manner so as to act as a guard against any tendency for the central bales to slip or buckle downwardly.

Basically, in achieving the above objects, it is contemplated that a device be provided incorporating a transporting vehicle having a truck bed and a carrying platform pivotally mounted thereon somewhat in the manner of a conventional dump truck. In addition, a lifting frame is, through a roller frame, mounted on the platform and rollable thereon and therefrom, being controlled by a winch controlled cable. The lifting frame, subsequent to a controlled rolling thereof from the upwardly pivoted platform, is positioned with the adjustable opposed sides thereof on the opposite sides of a stack to be raised. The sides are subsequently moved inwardly so as to clamp the lowermost layer of the bales therebetween with the remaining layers being retained through selectively inwardly drawable frames positioned so as to extend for substantially the full height of the stack. Upon being clampingly engaged with the stack, the lifting frame is raised vertically, through appropriate hydraulic jacks, so as to lift the contained stack from the ground, after which the lifting frame is winched upon the inclined platform and lowered, with the final step consisting of a lowering of the platform itself onto the truck bed. The unloading of the stack will be effected by merely reversing the above steps. In this manner, the solidity of the stack can be preserved and no sliding or dragging of the stack is necessary such as would require substantial power and most likely have an adverse effect on the stack and bales.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Referring now more specifically to the drawings, reference numeral 20 is used to generally designate the bale stack raising and transporting device comprising this invention. This device 20 includes a transporting vehicle 22 having a truck bed 24 with a tilting frame or platform 26 hingedly engaged therewith as indicated at 28, the movement of the platform 26 being controlled by suitable hydraulic jack means 30 much in the manner of a conventional dump truck.

Figure 1:
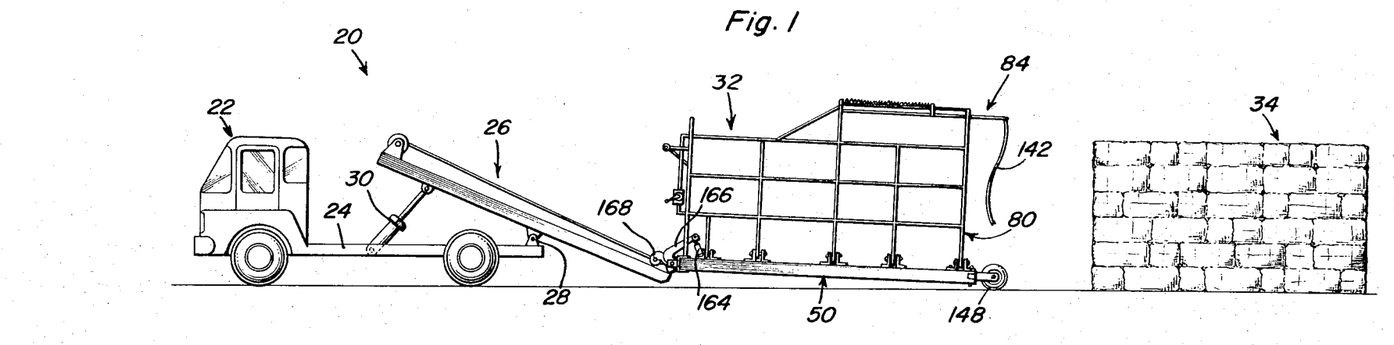
FIGURE 1 is a side elevational view of the over-all device positioned for engagement with a bale stack located on the ground just to the rear thereof.
Figure 2:
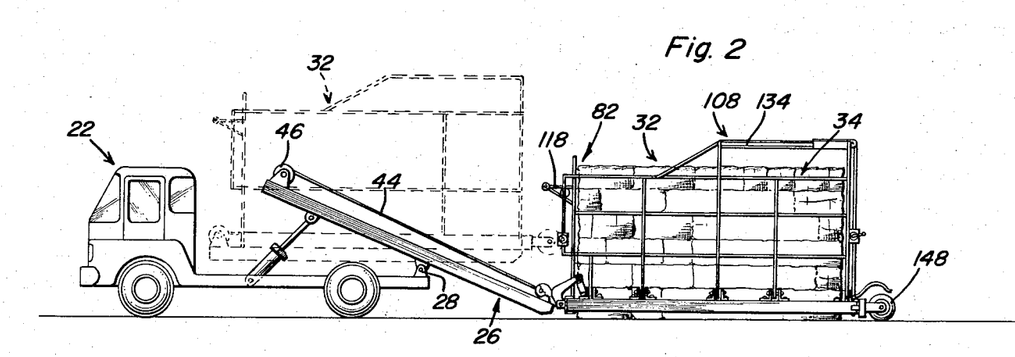
FIGURE 2 is a side elevational view of the device subsequent to engagement with the stack with the loaded position of the lifting frame being illustrated in phantom lines.
Figure 3:
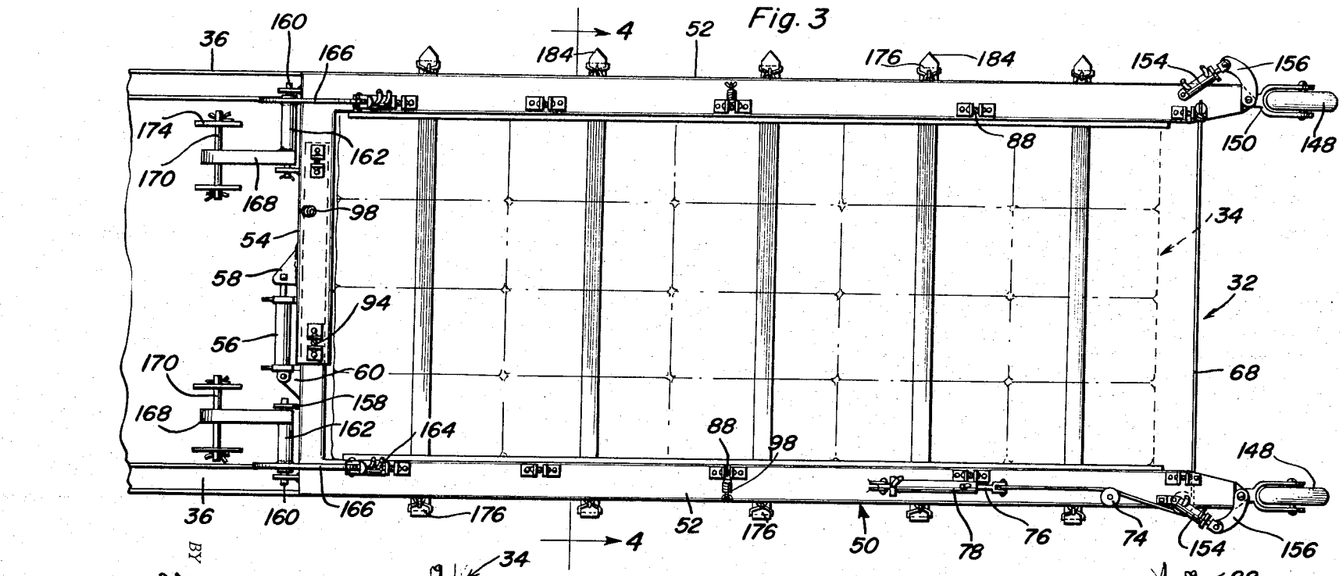
FIGURE 3 is a top plan view of the lifting frame with portions of the superstructure removed for purposes of illustration.
Figure 4:
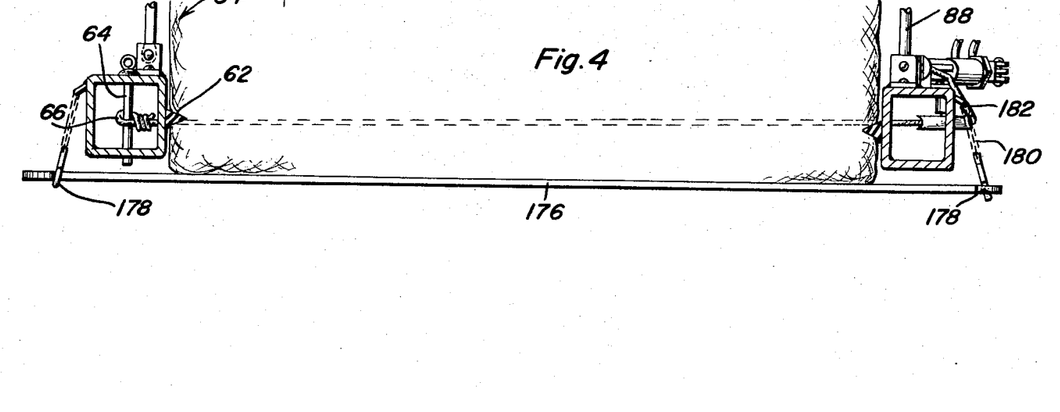
FIGURE 4 is an enlarged transverse cross-sectional view taken substantially on a plane passing along line 4—4 in FIGURE 3.

As will be noted from FIGURES 1 and 2, the hinged engagement 28 between the truck bed 24 and the tilting platform 26 is located at a central portion of the platform 26 with the rearwardly projecting portion of the platform 26 being sufficient so as to enable a positioning thereof adjacent to the ground surface upon an activation of the hydraulic jack 30. Finally, a lifting unit 32 is mounted for rolling movement between a first position overlying the tilting platform and a second position rearward thereof, this unit 32, in its rearwardly projecting second position, being positionable about a stack of hay bales or the like 34 for selective engagement therewith.

Figure 8:
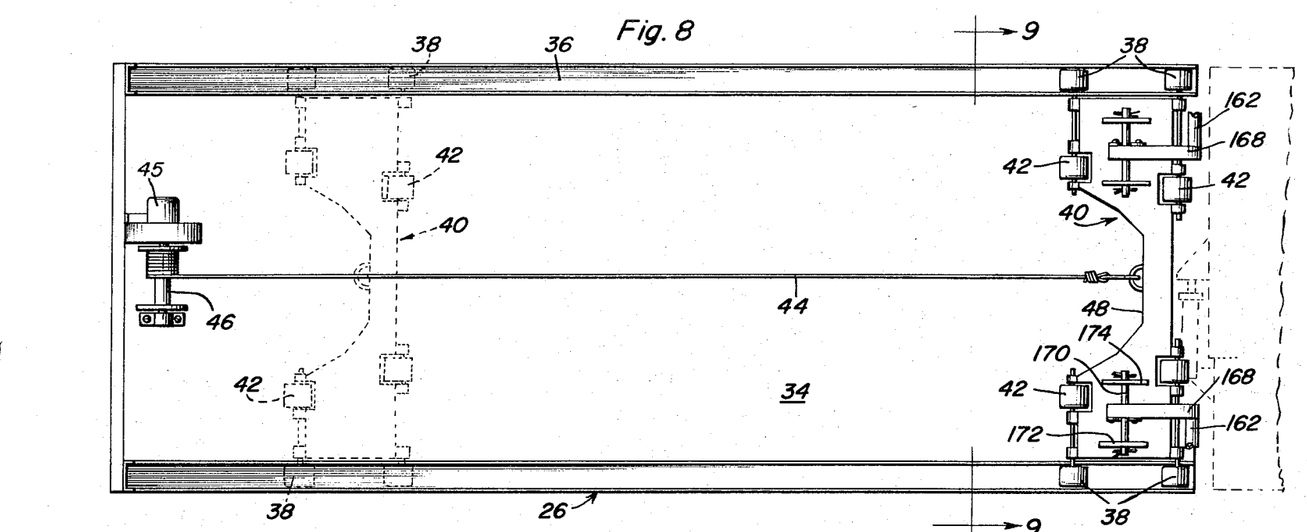
FIGURE 8 is a top plan view of the tilting platform with the roller frame mounted thereon.
Figure 9:
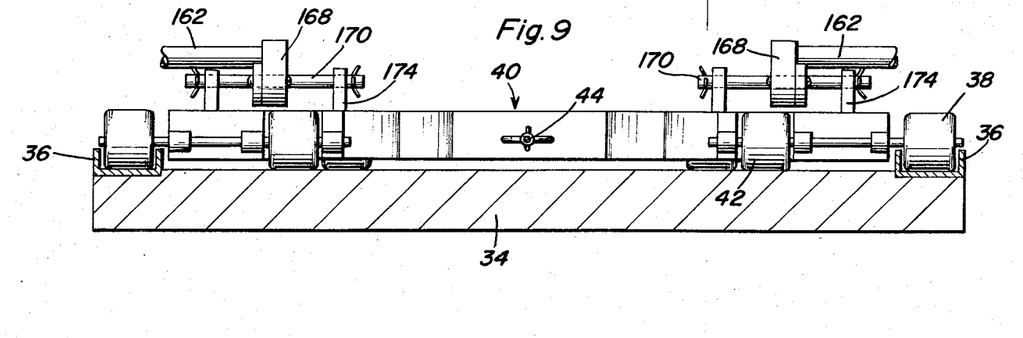
FIGURE 9 is an enlarged transverse cross-sectional view taken substantially on a plane passing along line 9—9 of FIGURE 8.
Figure 10:
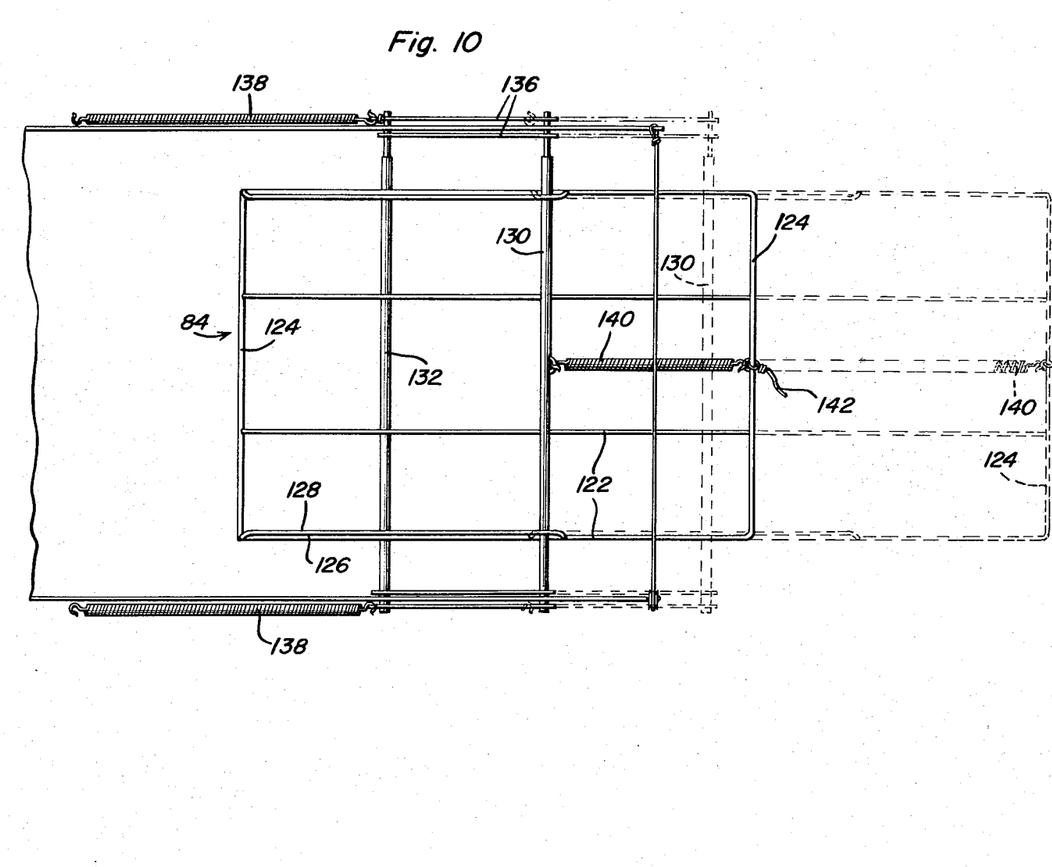
FIGURE 10 is a partial top plan view of the lifting frame unit illustrating the tail gate construction associated therewith.

The tilting platform 26 includes a flat deck 34 having a pair of parallel upwardly directed channel-shaped roller tracks 36 fixed thereon along the full length thereof at the outer side edges. These tracks 36 receive the outer rollers 38 of the four pairs of rollers rotatably engaged with and supporting a roller frame 40 extending transversely across the tilting platform 26. As will be appreciated from FIGURE 8, two pairs of rollers are provided at each end of the roller frame 40, one pair being mounted on both the forward and rear edge thereof with the outermost rollers 38 engaged within and guided by the corresponding track 36 and with the inner rollers 42 freely rolling on the platform deck 34. The rollers 38 and 42 are free rolling for movement of the roller frame 40 along the platform 26 with the forward movement of the roller frame 40 being effected through a winch wound cable 44 powered through any conventional winch 46 powered by motor 45, and rearward movement of the roller frame 40 being effected through a controlled release of the winch 46 as the paltform 26 is tilted through the hydraulic jacks 30. It is contemplated that the roller frame 40 have a forwardly directed recess 48 defined therein for the accommodation of the winch 46 and motor 45 therein as the roller frame 40 approaches the forward end of the platform 26, thereby enabling a positioning of a maximum length of the lifting unit 32 on the platform 26, this lifting unit 32 having the forward end thereof supported on and movable with the roller frame 40 as shall be explained presently.

The lifting unit 32 includes an elongated U-shaped lifting frame 50 which in turn consists of a pair of elongated hollow rectangular side beams 52, the forward ends of which are integrally engaged with laterally or right angularly directed front beams 54, one of which has a cross-sectional area slightly less than the other and is telescopically received therein for a selective movement of the side rails 52 toward and away from each other while maintaining the general parallel relationship therebetween. This movement is effected primarily through a hydraulic jack 56 having the opposite ends thereof fixed to a pair of ears 58 and 60 respectively fixed to and projecting forwardly from the two telescoping front frame beams 54. It is through the inward movement of the side beams 52 that the lowermost layer of the bales within the stack 34 is compressed and clampingly gripped for a subsequent raising of the stack 34. The gripping engagement can be enhanced by the provision of full length inwardly projecting gripping flanges 62 along the inner portion of each of the side beams 52, these flanges 62 tending to bite slightly into the adjacent bales and reducing the tendency for the bales to slip.

While the hydraulic jack 56 will function so as to both move the side beams 52 inwardly and into clamping engagement with the stack 34 and outwardly so as to effect a release of the stack, it is deemed desirable to provide auxiliary means for assisting in the inwardly directed clamping movement of the rear ends of the elongated side beams 52. Accordingly, one of the beams 52 is provided, adjacent the rear end thereof, with removable pin 64 which is received through the loop defining end 66 of an elongated cable 68 introduced through the inner side of the corresponding beam 52 through an opening 70 provided therein. The cable 68 extends from the pin engagement with the first beam 52 across the rear of the frame 50 and through the rear end portion of the opposed beam 52 where it is engaged about an internally mounted pulley 72 with the cable 68 then extending forwardly over the second beam 52, guided by pulley 74, and into engagement with the piston 76 of a hydraulic jack 78 mounted on the upper surface of the beam 52. In operation, after the lifting frame 50 has been positioned about a bale stack, the looped end 66 of the cable 68 is engaged with the pin 64 and the hydraulic jacks 56 and 78 both activated so as to effect an inward movement of the beams 52 into engagement with the lowermost layer of the stack 34. When it becomes necessary to release the stack 34, the jack 78 releases the tension on the cable 68 and the jack 56 operates so as to move the beams 52 outwardly relative to each other.

The upper portion or layers of the stacks are stabilized by means of vertical opposed side panels 80, a front panel 82 and a tail gate 84. Each side panel 80 includes a network of welded horizontal and vertical spaced rods 86 and 88 of a length substantially equal to the length of the lifting frame 50 and of a height generally equal to the contemplated height of the bale stack to be lifted by the lifting unit 32. Each of the vertical rods 88 is pivotally engaged, at the lower end thereof, to the upper surface of the corresponding beam 52, generally by being journalled on a pivot pin 90 the opposite ends of which are engaged in suitable bearing members 92 permanently affixed to the beam 52. The front panel 82 is also constructed of a plurality of welded vertical rods 94, pivotally engaged at the lower ends thereof to the larger of the front beams 54, and horizontal rods 96. Both the side panels 80 and the front panel 82 are spring biased outwardly relative to the slack accepting space within the frame 50 by means of elongated coil tension springs 98 engaged between the beams 52 and 54 outward of the corresponding panel 80 or 82 and the panel itself at a point spaced upwardly from the lower portion thereof. This outward biasing of the panels 80 and 82 insures an unencumbered positioning of the lifting unit 32 about the stack 34 to be raised and transported with the outward movement of the panels 80 and 82 being limited by front and rear control cables which in turn produce the desired inward movement of the panels so as to effect a clamping of the received stack 34 thereby.

The rear cable means by which the side panels 80 are pivoted inwardly toward each other and into engagement with the bale stack 34 consists of an elongated cable 100 having a first end 102 thereof fixed to the upper rear corner of a first one of the side panels 80 with the cable 100 extending therefrom over a guide pulley 104 mounted on the upper rear corner of the second of the side panels 80 and down to a manually operated cable winch 106 fixed to the side of the second of the side panels 80. As will be appreciated from the drawings, the secured end 102 of the cable 100 as well as the guide pulley 104 are actually mounted above the main portion of the side panels 80 and on a vertically extended portion 108 provided so as to mount the tail gate 84 in its overhead stored or inoperative position as shall be described subsequently.

The cable control means at the front of the side panel 80 also consists of an elongated cable 110 fixed at one end 112 to a first one of the side panels 80 and extending therefrom over a guide pulley 114 on the second of the frame panels 80 and down to wrapped engagement about a hand winch 116 mounted on the second of the panels 80. It will be noted that the cable 110 also functions so as to selectively pivot the front panel 82 to restraining contact with the front of the bale 34. This is effected through the provision of a forwardly projecting arm 118 on the front panel 82 at approximately the same height as the secured end 112 of the cable 110 and generally centrally between the side panels 80. This arm 118 has a guide ring 120 fixed to the forward end thereof and slidably receiving the cable 110 therethrough as it extends from the secured end 112 to the guide pulley 114. In this manner, as the cable 110 is wound on the winch 116 so as to draw the side panels 80 inwardly toward each other, the front panel 82 will simultaneously be moved rearwardly against the biasing force of its spring 98.

The tail gate 84 is movable between a first horizontal position overlying the side panels 80 and supported therebetween on the extensions 108, and a second vertical position pivoted downward from the horizontal position and engaged against the rear of the bale stack. The tail gate itself is rectangular in shape and includes four longitudinal bars 122 welded to and interconnected by two transverse end bars or rods 124. Associated with each of the outer longitudinal bars 122, and defining a closed track 126 therewith, is a second bar 128 paralleling the bar 122 in spaced relation thereto for a little more than one-half of the length thereof starting from the uppermost end bar 124. The aligned tracks 126 receive an elongated pivot rail 130 slidably therethrough with the relationship between the rail 130 and the track 126 being such so as to enable the gate 84 to be both slid longitudinally on the rail and pivoted relative thereto. A second rail 132, spaced forwardly of and paralleling the rail 130 is also provided, the gate, in its horizontal or retracted position resting upon the rail 132. Both rails 130 and 132 are telescopic in nature and have the opposite ends thereof slidably received within a pair of elongated tracks 134, defined by upper and lower bars, which constitute the upper portion of the extension 108. The rails 130 and 132 have the corresponding ends thereof interconnected by flat plates 136 which in turn retain these rails in engagement with the corresponding tracks 134 throughout the opening and closing pivotal movement of the side panels 80, the telescopic nature of the rails 130 and 132 enabling an accommodation of this movement of the side panels 80.

The combined rails 130 and 132 are normally biased forwardly on the tracks 134 by a pair of elongated coil tension springs 138 engaged between the forward end of the portions 108 and the connecting plates 136. By the same token, the tail gate 84 is biased forwardly and into its horizontal position by an elongated coiled tension spring 140 engaged between the center of the rail 130 and the lower end bar 124 of the gate 84. In this position, it will be appreciated that the tail gate 84 is supported in a horizontal position on the rails 130 and 132 and is completely withdrawn from the rear of the lifting unit 32 so as to not interfere with the reception of the unit 32 about the bale stack 34.

Figure 7:
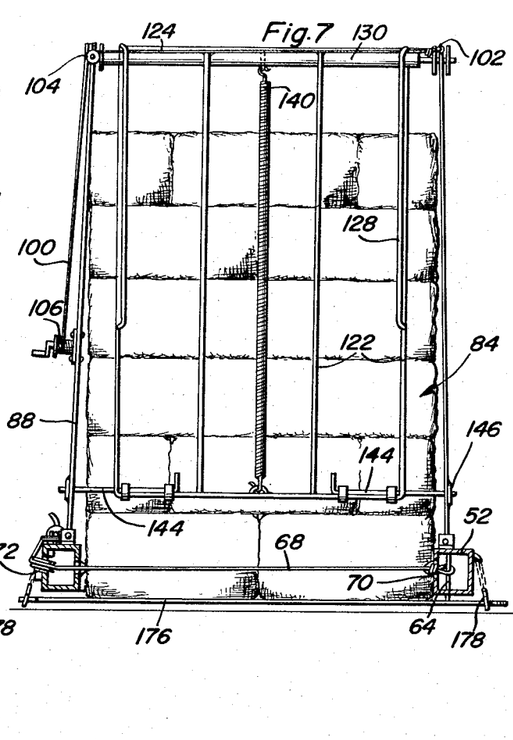
FIGURE 7 is an elevational cross section through the lifting frame taken just to the rear of the tail gate.

After the stack has been received within the lifting frame 50, the lower end 124 of the gate 84 is grasped, normally through an elongated cord 142, and pulled downwardly. The gate 84 will both pivot and slide on the rail 130 until the forward or upper ends of the tracks 126 contacts the rail 130. At this point, the lower end of the gate 84 is pushed forwardly toward the stack, this normally being at approximately the second layer of bales, this in turn resulting in the upper portion of the gate 84 contacting the upper layers of the stack 43 and resulting in a forward movement of the interconnected rails 130 and 132 against the force of the biasing springs 138. Upon achieving a vertical positioning of the gate 84, generally coplanar with the rear ends of the side panels 80, a pair of locking rods 144, slidably mounted on the lower end of the gate 84, attention being particularly directed to FIGURE 7, are slid laterally outward for locking reception within suitable keepers 146 mounted on the adjoining side panels 80. In this manner, the tail gate 84 is quickly and simply locked in stack retaining position with the biasing force of the upper springs 138 providing a constant pressure on the rear end of the stack 34 so as to resist any tendency for either the stack or the individual bales to shift. The release of the tail gate 84 simply involves a retracting of the locking rods 144 and a guiding of the gate 84 as it is moved upwardly and inwardly through the action of the biasing springs 138 and 140 to its horizontal position overlying the rail 132 which, in conjunction with the rail 130 engaged to the track 126, safely positions the tail gate 84 out of the way of any loading or unloading procedure.

The rear end of the U-shaped lifting frame 50, and thereby the lifting unit 32 itself, is supported by a pair of wheels 148, one associated with the rear end of each of the side rails 52 by a wheel mount 150 which is in turn pivotally engaged with the rear end of the corresponding beam 52 by means of a vertical pivot pin 152. Each mount 150 is fixed to the corresponding pin 152 which in turn is rotatably controlled by means of a small hydraulic jack 154 engaged between the corresponding beam 52 and the outer end of an arcuate control arm 156. It is through these rotatably mounted power controlled wheels 184 that a proper aligning of the lifting unit 32 can be achieved in a simple and efficient manner without requiring any extensive or precision maneuvering of the entire device 20 during the backing of positioning of the device 24 and engaging of the lifting frame 50 about a bale stack 34.

Figures 5, 12, 13:
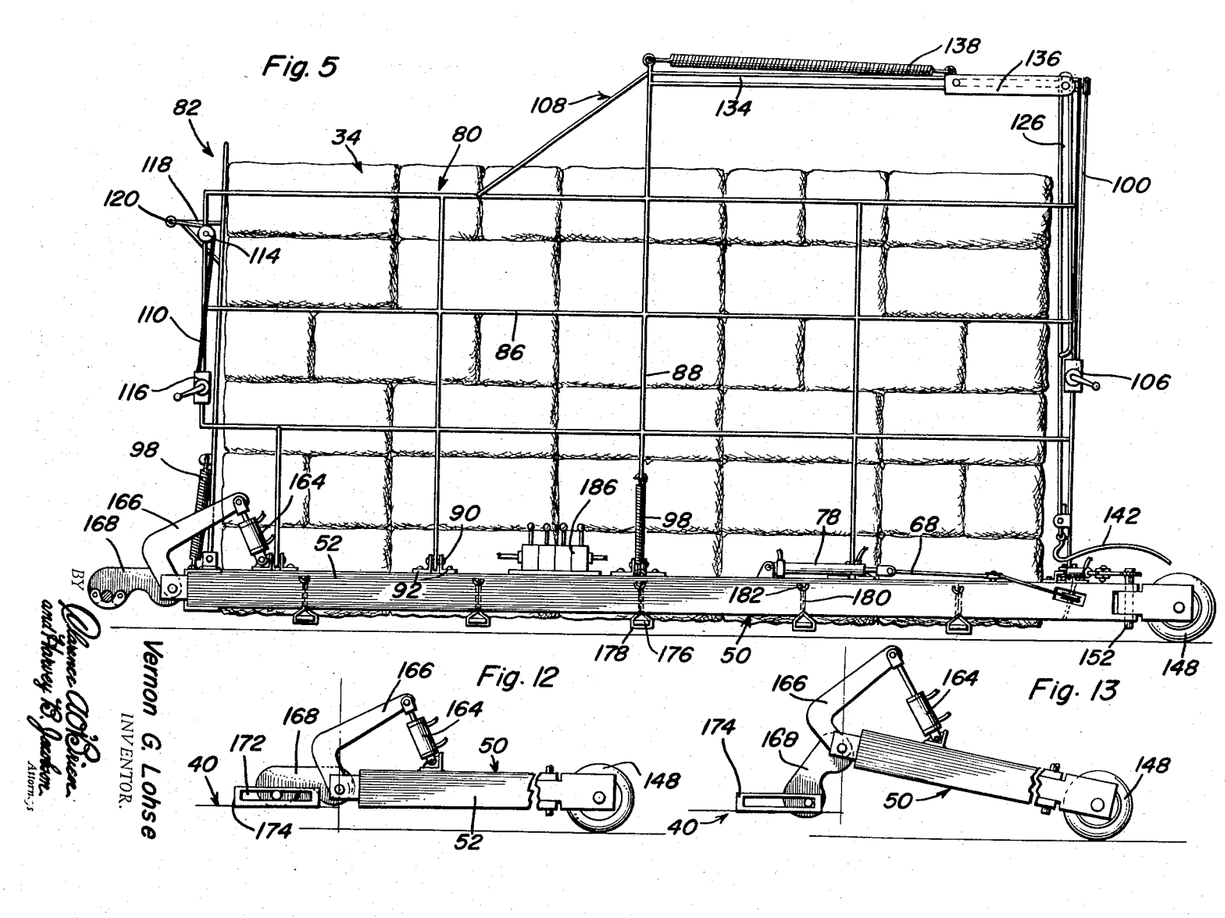
FIGURE 5 is a side elevational view of the lifting frame supporting a bale stack.
FIGURES 12 and 13 are schematic side views illustrating the manner in which the forward end of the lifting frame is raised and lowered.
Figure 6:
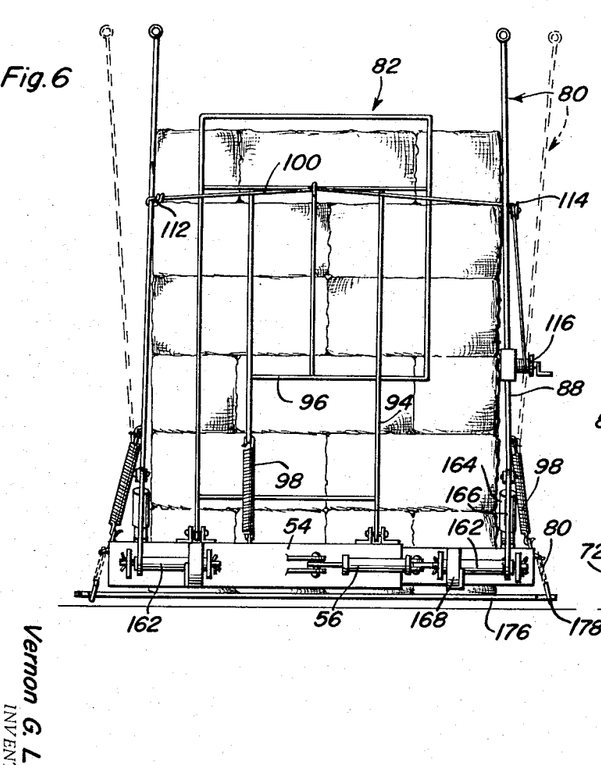
FIGURE 6 is a front elevational view of the lifting frame.

The forward end of the lifting frame 50, thereby the entire lifting unit 32, is supported on the roller frame 40 and is vertically adjustable relative thereto, as schematically illustrated in FIGURES 12 and 13, so as to enable a movement of the frame 50 between a horizontal loading or unloading position and an inclined position for winching onto or off of the tilting platform 26. Each of the front frame beams 54 has, by means of a pair of spaced brackets 158, an elongated shaft 160 mounted parallel with and spaced forward of the front face thereof. Each of the shafts 160 rotatably mounts an elongated pipe 162 which is rotatably moved and controlled by an associated hydraulic jack 164 engaged between the adjoining side rail 52 and the outer end of an elongated right angularly bent control arm 166 fixed to and extending from the pipe 162. Also, fixed to each of the pipes 162 and responsive to the rotation thereof is a forwardly projecting pressure arm 168 which in turn has the forward end thereof fixed to a shaft 170 rotatably and slidably supported within elongated slots 172 defined within a pair of opposed brackets 174 fixed to the roller frame 40. The slotted brackets 174 as will be appreciated from FIGURES 12 and 13, enable the vertical movement of the forward end of the lifting frame 50 necessary so as to both position the lifting frame 50 horizontally and quite close to the ground rearward of the tilting platform 26, and also so as to enable a raising of the forward end of the lifting frame 50 so as to clear the rear end of the tilting platform 26 and facilitate a winching of the lifting frame onto the tilting platform. It will of course be recognized that all movements of the lifting frame 50 are to be rolling movements with the forward end of the frame 50 being supported on the roller frame 40 which in turn rolls on the rollers 38 and 42, and with the rear end of the lifting frame 50 being supported upon the steering wheels 148.

While not normally needed, inasmuch as most hay bales are packed sufficiently solid so as to enable an entire stack 34 to be held firmly by the lifting frame 50, auxiliary tubular support bars 176 can be provided. These support bars 176 will underlie the lifting frame 50 and extend transversely thereacross at spaced points along the length of the frame 50 with these bars merely functioning as a safety measure so as to prevent any buckling downward of the center bales in the stack such as might arise when dealing with loosely packed bales. Each of the ends of each of the tubular bars 176 is received through a ring 178 which is in turn suspended by a chain 180 suspended from a hook 182 fixed to the side beam 52. In actual use, the bale 34 is gripped by the frame 50 and raised from the ground, after which the tubular bars 176 are slid under the stack 34 and into the opposed rings 178, the leading end 184 of each of the bars 176 being tapered if desired so as to facilitate its introduction through the support rings 178, and also so as to facilitate its passage beneath the stack 34.

Figure 11:
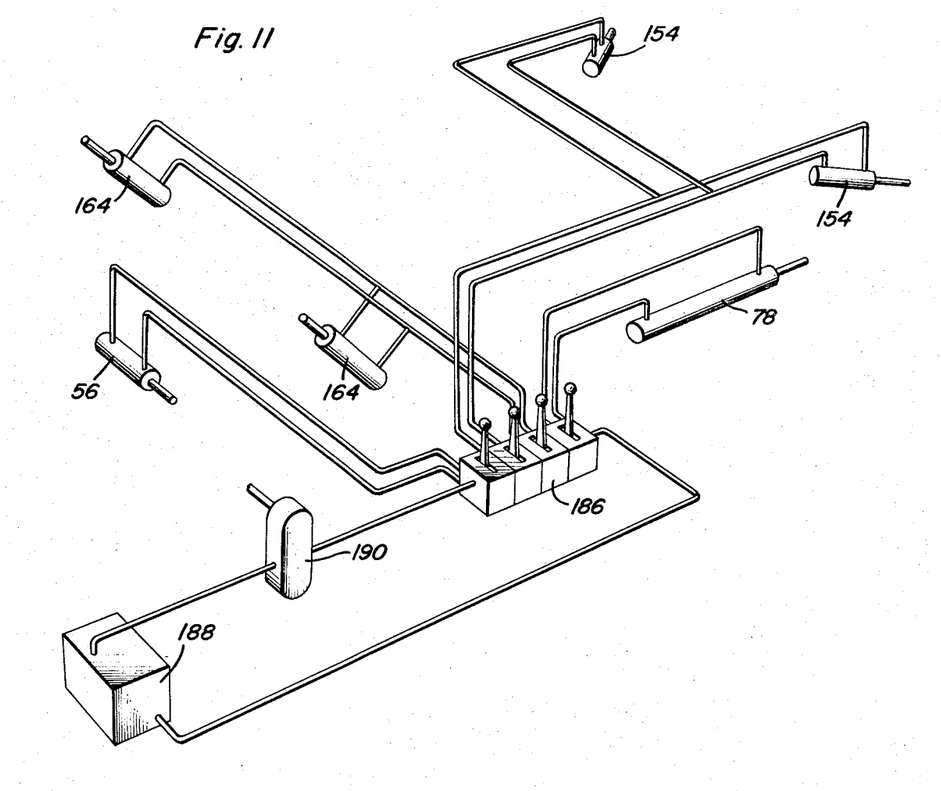
FIGURE 11 is a schematic diagram of the control system.

With specific reference to FIGURE 11, it will be noted that the various movement controlling jacks have been schematically illustrated as being controlled from a central control box 186, which may be mounted directly on the lifting frame 50. The hydraulic fluid will of course be provided from any suitable reservoir 188 by means of a conventional pump 190 driven from the transporting vehicle 22 in any suitable manner.

In use, the device 20, with the tilting platform 26 and lifting unit 32 positioned horizontally thereon as illustrated in phantom lines in FIGURE 2, is positioned in alignment with and forward of a stack 34 to be lifted and transported. The tilting platform 26 is tilted after which the forward end of the lifting unit 32 is elevated with the side beams 52 of the lifting frame 58 being raised from the platform channel tracks 36 upon which they normally rest. Next, the lifting unit 32 is rolled rearwardly off of the tilting platform 26 through a controlled lengthening of the winch held cable 44. After the roller frame 40 reaches the rear end of the tilting platform 26, the rearward movement of the roller frame 40 being limited by suitable stops if so desired, the forward end of the lifting frame 50 is lowered so as to position the frame horizontally and the frame is guided, with the assistance of the rear steering wheels 148, about the stack 34 to be raised. It will be appreciated, that if so desired, the frame 50 can be guided about the stacks 34 prior to a lowering of the forward end thereof. Once the frame 50 has been positioned about the stack, the side beams 52 are moved inwardly toward each other into clamping engagement with the lowermost stack layer with the side and front panels subsequently being brought into clamping engagement with the remainder of the stack, after which the tail gate is pivoted downwardly into pressure applying position adjacent the rear end of the stack 34. Once the stack has been properly clamped by the lifting unit 32, it is raised directly up from the ground, through a lifting of the forward end of the lifting frame 50, after which, if deemed necessary, the safety or support bars 176 can be applied. With the forward end of the lifting unit 32 raised, the lifting unit 32 is winched onto the inclined tilting platform 26. After the lifting unit 32 is completely winched onto the platform 26, the lifting unit 32 is lowered so as to rest the side beams 52 on the channel-shaped tracks 36, after which the tilting frame 26 is lowered into position. In this manner, the entire stack is mounted on the truck bed as a single unit without there being any necessity of handling the individual bales, tying or binding up the stack prior to the lifting thereof, or sliding the stack along the ground such as would tend to disrupt the bales therein. Incidentally, the fact that the stack is lifted vertically off the ground, rather than being slid therealong is of particular significance in that there is a substantial adherence between the hay bales and the ground after being stacked for any length of time, this arising mainly from the accumulation of moisture between the hay bales. Therefore, the amount of force required to slide the stack would be substantially greater than that actually necessary to raise the stack vertically from the ground. Once the stack has been clamped and raised, the roller and wheel supports for the lifting frame 50 enable a rapid and relatively simple movement of the stack onto the truck bed. The unloading of the stack merely involves a reversal of the above procedure with the stack being deposited on the ground in substantially the same condition as it was when originally lifted and with the same ease as involved in the lifting.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling with the scope of the invention as claimed.

What is claimed as new is as follows:

1. A bale stack transfer device comprising a movable bed, a tilting platform mounted on said bed and movable between a first position overlying said bed and a second position tilted rearwardly and downwardly relative to said bed, and a lifting frame, roller means supporting the forward end of said frame on said platform for movement therealong, wheel means supporting the rear end of said frame for movement along the ground, said lifting frame being movable between a first position overlying said platform and a second position extending rearwardly therefrom, said lifting frame including laterally spaced longitudinally disposed gripping members, means for selectively moving said members toward each other for gripping engagement with a bale stack positioned therebetween, means for elevating said lifting frame so as to effect a vertical raising of a gripped stack, and means for moving said lifting frame from its second position to its first position overlying said platform.

2. The device of claim 1 wherein said gripping members comprise a pair of elongated side beams, said means for elevating said frame being engaged between the forward ends of said beams and said roller means for effecting a vertical adjustment therebetween and a pivotal raising of the frame about the rear end supporting wheel means.

3. The device of claim 2 including a vertical side panel pivotally mounted on and projecting upward from each beam, and means engaged between the panels for selectively pivoting the panels toward each other and into clamping engagement with a bale stack positioned herebetween and gripped by said side beams.

4. The device of claim 3 including a vertical front panel, means pivotally mounting said front panel between the forward ends of said beams, and means engaged with said front panel for selectively pivoting said front panel rearwardly against a bale stack positioned between the side beams.

5. The device of claim 4 including a tail gate, means mounting said tail gate for movement between a horizontal first position supported by and between the upper portions of the side panels and a vertical second position generally between the rear ends of said side panels, and means for resiliently urging said tail gate forwardly between said side panels.

6. The device of claim 5 wherein said wheel means comprises a steerable wheel mounted on the rear end of each beam, and means associated with each wheel for effecting the steering thereof.

7. The device of claim 2 including a front beam fixed to the forward end of each side beam and projecting laterally therefrom toward the other side beam, said front beams being slidably engaged with each other so as to allow for a movement of the side beams toward and away from each other, said means for elevating said frame comprising a pair of rotatably mounted members, one mounted on and paralleling each front beam, each rotatably mounted member having a rearwardly directed arm fixed thereto and overlying the forward portion of one of the side beams, and a forwardly directed arm fixed thereto and having the forward end thereof pivoted to the roller means, and extensible means engaged between each side beam and the corresponding rearwardly directed arm for effecting a rotation of the rotatably mounted member and a downward biasing of the forwardly directed arm with a corresponding raising of the forward end of the lifting frame.

8. The device of claim 5 wherein the means mounting said tail gate comprises a first rail extending transversely across the upper edges of the side panels adjacent the rear thereof, said tail gate including track means along a substantial portion of its length commencing with the upper or forward end thereof, said track means being slidably and pivotally received on said first rail, a second rail extending transversely across the upper edges of the side panels forward of the first rail, the forward portion of said tail gate, in its horizontal position, overlying and being supported on said second rail, means engaged between said first rail and the lower or rear end of said tail gate resiliently biasing said rear end of the tail gate toward said first rail.

9. The device of claim 8 including means rigidly interconnecting said first and second rails and means slidably mounting said rails for forward and rearward movement on said side panels, said means for resiliently urging said tail gate forwardly including spring means engaged between the interconnected rails and the side panels forward of the second rail.

10. The device of claim 2 including a plurality of support bars positionable transversely across said frame beneath said side beams, each support bar having the opposite ends thereof received within a support ring fixed to and depending below the corresponding side beam.

11. A bale stack transfer device including a frame, said frame including a pair of longitudinally extending laterally spaced side beams, means interconnecting said beams for selectively moving said beams toward each other and into gripping engagement with a bale stack positioned therebetween, roller means supporting the forward ends of said beams, wheel means supporting the rear ends of said beams, and means engaged between the forward ends of said beams and the roller means for varying the vertical height therebetween so as to pivot the frame upwardly about said wheel means.

12. The device of claim 1 wherein said means for selectively moving said members toward each other include at least one hydraulic jack.

13. The device of claim 1 wherein said means for elevating said lifting frame include a plurality of hydraulic jacks.

14. The device of claim 6 wherein said means associated with each wheel for effecting the steering thereof include a plurality of hydraulic jacks.

15. A material transfer device comprising a bed, a movable platform mounted on said bed and movable between a first position overlying said bed and a second position rearwardly and downwardly located relative to said bed, a transfer frame, means for supporting said frame on said platform for movement therealong, means supporting said frame for movement along the ground, said frame being movable between a first position overlying said platform and a second position extending rearwardly therefrom, said frame including laterally disposed gripping members, means for selectively moving said members toward each other for gripping engagement with a mass of material positioned therebetween, means for positioning said frame so as to effect a displacement of said gripped material onto said platform and means for moving said frame from its second position to its first position overlying said platform.

16. A material transfer device including a frame characterized by a pair of longitudinally extending laterally spaced side beams, means for supporting the forward end of said frame, means for supporting the rearward end of said frame, means interconnecting said beams for selectively moving said beams toward each other into gripping engagement with a mass of material positioned therebetween, means for elevating said frame comprising a pair of rotatably mounted members, one of each said rotatably mounted members mounted on and paralleling a front beam, each rotatably mounted member having a rearwardly directed arm fixed thereto and overlying the forward portion of one of the side beams, and a forwardly directed arm fixed thereto and having the forward end thereof pivoted to said forward supporting means, an extensible means engaged between each side beam and corresponding rearwardly directed arm for effecting a rotation of the rotatably mounted member and a downward biasing of the forwardly directed arm with a corresponding raising of the forward end of the frame.

References Cited

UNITED STATES PATENTS

| | | | |
|---|---|---|---|
| 726,420 | 4/1903 | Frazier | 214—930 |
| 2,502,309 | 3/1950 | Byrd | 280—43.11 X |
| 3,019,926 | 2/1962 | Christenson | 214—392 |
| 3,071,264 | 1/1963 | Totaro et al. | 214—515 X |
| 3,145,864 | 8/1964 | Arnold | 214—396 |

GERALD M. FORLENZA, Primary Examiner.

ALBERT J. MAKAY, Examiner.